United States Patent
Schneider (10) Patent No.: US 7,987,357 B2
(45) Date of Patent: Jul. 26, 2011

(54) DISABLING REMOTE LOGINS WITHOUT PASSWORDS

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 909 days.

(21) Appl. No.: 11/946,278

(22) Filed: Nov. 28, 2007

(65) Prior Publication Data
US 2009/0138703 A1 May 28, 2009

(51) Int. Cl.
*H04L 29/06* (2006.01)
*G06F 21/00* (2006.01)
*G06F 17/30* (2006.01)

(52) U.S. Cl. ............. 713/155; 713/165; 713/183; 726/6

(58) Field of Classification Search .................. 713/155, 713/165, 183; 726/6
See application file for complete search history.

(56) References Cited

U.S. PATENT DOCUMENTS

| | | | |
|---|---|---|---|
| 7,779,452 B2* | 8/2010 | Goldberg | 726/4 |
| 2006/0136761 A1* | 6/2006 | Frasier et al. | 713/320 |
| 2006/0248082 A1* | 11/2006 | Raikar et al. | 707/9 |

* cited by examiner

*Primary Examiner* — Michael Pyzocha
(74) *Attorney, Agent, or Firm* — Lowenstein Sandler PC (57) ABSTRACT

A method and apparatus for disabling password-less remote logins. In one embodiment, the method comprises receiving a remote login request at a first computing system from a user of a second computing system. Both of the first computing system and the second computing system mount home directories from a file sever. The request includes a public key associated with the user. An authorized key file associated with the user is located in the home directories. The authorized key file has zero length and owned by a root user of the file server. The method further comprises prompting the user of the second computing system for a password in response to the request.

20 Claims, 9 Drawing Sheets

```
int rm_ssh_authkey(const char *file)
{
   /* create or truncate the file */
   int fd = open(file, O_WRONLY|O_CREAT|O_TRUNC);

/* Did we succeed in opening the file? */
   if (fd<0)
       return -errno;    /* Return on error */

/* Change the ownership of the file */
   if (fchown(fd, 0, 0) < 0)
   {
      close(fd);
      return -errno;
   }

/* Change access permissions */
   if (fchmod(fd, 0600) < 0)
   {
      close(fd);
      return -errno;
   }

/* Truncate the file, just in case */
   if (ftruncate(fd, 0) < 0)
   {
      close(fd);
      return -errno;
   }

/* close and return */
   return close(fd)<0?-errno:0;
}
```

```
# Setup
HOMES=/exports/homes/vol1
PRIVDIR=$HOMES/tmp.root.$$

# Create the root-only directory
mkdir -p $PRIVDIR
chmod 700 $PRIVDIR
cd $PRIVDIR

# Iterate over the home directories
for fi in `/bin/ls -1d $HOMES/* | grep -v $PRIVDIR` ; do
    # Create the zero-length file
    touch tmp.$$

# Only root can read this
    chmod 600 tmp.$$

# Create the directory, if necessary
    mkdir -p $fi/.ssh

# Move the file
    mv tmp.$$ $fi/.ssh/authorized_keys
done
```

FIG. 5B

```
 * Create a zero-length, unwriteable ssh authorized_keys file */
/* Arguments: dir - the path to the user's .ssh directory
 * fname - the filename to use (normally, "authorized_keys") */ int rm_ssh_authkey(const char *dir, const char *fname)
{
   char fnbuf1[FILENAME_MAX], fnbuf2[FILENAME_MAX];

/* Ensure the temp file is created with permissions 0600 */
   int fd = umask(077);

/* We need a temp file name, so ... */
   int fnlen1 = snprintf(fnbuf1, FILENAME_MAX, "%s/%s", dir, "XXXXXX");

/* And the authorized keys filename */
   int fnlen2 = snprintf(fnbuf2, FILENAME_MAX, "%s/%s", dir, fname);

if(fnlen1 >= FILENAME_MAX || fnlen2 >= FILENAME_MAX)
       /* The directory name was too long */
       return -(errno = ENAMETOOLONG);

/* create the temp file */
   fd = mkstemp(fnbuf1);
   if(fd<0)
       /* Couldn't create the temp file */
       return -errno;

/* If we get to here, we have a temp file in the same directory,
    * mode 600, owned by root, and guaranteed to be unique */ if(close(fd)<0)
       return -errno;

/* Move the temp file, clobbering the existing file */
   return rename(fnbuf1, fnbuf2)?-errno:0;
}
```

DISABLING REMOTE LOGINS WITHOUT PASSWORDS

TECHNICAL FIELD

Embodiments of the present invention relate to computer security, and more specifically, to management of encryption key files for secure remote logins.

BACKGROUND

Network File System (NFS) is a network file system protocol that allows a user on a client computer to access files over a network. An NFS server is a storage server which operates according to the NFS protocol to store and manage files for its clients. An NFS server makes available (i.e., "exports") certain stored resources (e.g., files) to certain clients. A particular client can request to "mount" an exported resource (i.e., request to be granted the ability to access an exported resource) in NFS by sending a "mount request" to the file server. If the client has permission to access the resource, the NFS server allows the client to "mount" the resource by returning a file handle describing the pathname of the resource to the client in response to the mount request. After the resource (e.g., a home directory) is mounted to the client and a user ID is received, the NFS server will authenticate the user to access the files in the user's home directory.

Conventionally, additional layers of security have been deployed on a system that mounts resources from an NFS server. One technique for authenticating a remote user is to request the user to submit a password in addition to the user's ID at the time of login. Another technique is to use the Secure Shell (SSH) protocol. SSH is a remote login network protocol that allows data to be exchanged over a secure channel between two computers. SSH uses cryptography to authenticate a user on a remote computer by matching the user's private key with a public key stored in the user's authorized key file. SSH can also authenticate a user using password authentication.

However, in an organization that lacks strict security policies, client computers (e.g., workstations) may be self-administered and a primary user can easily become the root user of his local computer at any time. This primary user can impersonate a second user and log onto a remote computer as the second user, provided that both the local computer and the remote computer mount home directories from the same NFS server. In one scenario, the primary user, by changing his user ID to the second user's user ID on his local computer, can create an illegitimate public key-private key pair, and add the illegitimate public key to the second user's authorized key file. The primary user can also create an authorized key file containing the illegitimate public key if the file does not already exist. As far as the NFS server is concerned, the primary user is the second user and can access any files in the second user's NFS home directory. Subsequently, the primary user may, from the local computer, send an SSH login request to the remote computer as the second user. The remote computer will locate the illegitimate public key from the second user's authorized key file, and perform an SSH public key-private key challenge-response. As the primary user holds the matching private key to the illegitimate public key, the primary user will be able to successfully log onto the remote computer as the second user. The access to other systems as a different user is important, because it may give the attacker (the primary user) the ability to exploit "back doors" installed by the spoofed user (the second user).

Therefore, a person with some technical skills can easily log onto any remote system from a local system as any user, as long as both the local and the remote systems mount home directories from the same NFS server. Thus, there is a need to overcome the security problems in the existing systems with respect to remote logins.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for disabling a feature of a remote login protocol that allows a user of a local computer to remotely log onto a remote computer over a network. The feature being disabled is password-less remote logins, e.g., remote logins using cryptographic keys, such as remote logins in accordance with the Secure Shell (SSH) protocol. After the disablement, remote logins can be performed using passwords. In one embodiment, password-less remote logins are disabled by replacing, for each user, an existing authorized key file with a new zero-length authorized key file. The new authorized key file is owned by the root user of the file server, such that access by anyone other than the root user will be denied.

In one embodiment, the disablement of password-less remote logins can be temporary. After the disablement, password-less remote logins can be restored in response to the addition of public keys into the new authorized key files. As the authorized key files are now owned by the root user of the file server, the only user who can change the authorized key files is the root user of the file server (such as a system administrator), and only on the file server itself. Therefore, the integrity of the authorized key files can no longer be tampered with by a malicious intruder.

In some systems, the concept of "ownership" of file and "access permissions" for a file are independent. For example, in the Unix® system, an owner of a file may not have access permissions to the file. However, for simplicity of the following discussions, an owner of a file as described herein is assumed to have access to the file, unless otherwise indicated.

The technique described herein is robust and simple. Illegitimate keys created before the disablement are eliminated by the use of zero-length authorized key files. Replacing existing authorized key files with zero-length authorized key files effectively deletes all of the existing keys, which may include illegitimate keys. As the new authorized key files are owned by the root user of the file server, an intruder will not be able to copy illegitimate public keys into the new authorized key files. Using the technique, a major security loophole in a file server, such as a Network File System (NFS) server, can be removed without changing existing structure of the file system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "creating", "receiving", "granting", "adding", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
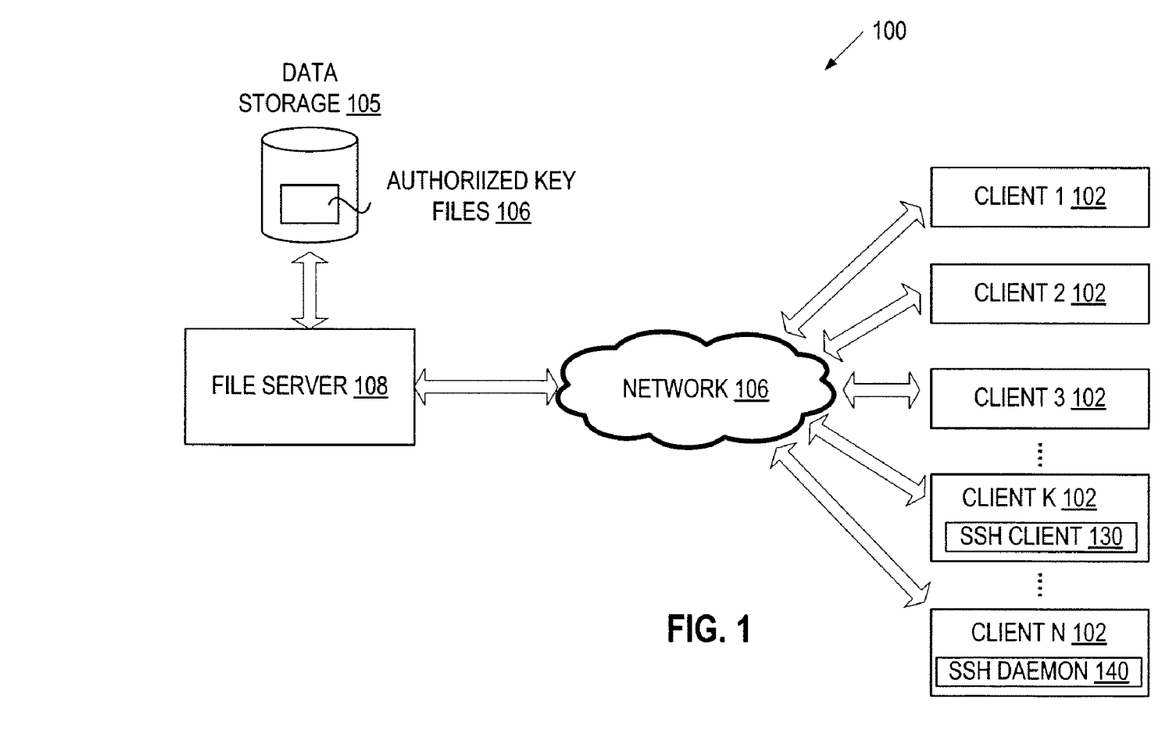
FIG. 1 illustrates a network architecture in which embodiments of the present invention may be implemented.

FIG. 1 illustrates an exemplary network architecture 100 in which embodiments of the present invention may operate. The network architecture 100 may include client devices (clients) 102, a file server 108 and a network 106. The clients 102 may be, for example, personal computers (PCs), mobile phones, palm-sized computing devices, personal digital assistants (PDAs), and the like.

In one embodiment, the file server 108 may be an NFS server that stores and manages files in data storage 105 for the clients 102. The file server 108 may contain a server front end responsible for network communications, plugins for server functions (such as security administration), a basic directory tree containing server-related data, and a database back end plugin responsible for managing the storage and retrieval of data from the data storage 105. The data storage 105 may comprise mass storage devices, such as magnetic or optical storage based disks or tapes. In one embodiment, the data storage 105 stores a plurality of authorized key files 106, each authorized key file associated with a user to allow the user to securely remote log onto a remote system.

The clients 102 are coupled to the file server 108 via the network 106, which may be a public network (e.g., Internet) or a private network (e.g., Ethernet, a Local Area Network (LAN), or a corporate intranet). At least some of the clients 102 use the Secure Shell (SSH) protocol to provide a secure channel for remote logins. To form a SSH channel between two clients 102 (e.g., a client K and a client N), client K (which is local to a user) runs an SSH client 130, and client N (to which the user wishes to remotely login) runs an SSH daemon 140 in the background. Thus, when the user of client K sends a remote login request to client N, client N acts as an SSH server to client K.

To further discuss the technique of disabling password-less remote logins, it is useful to explain the process of remote logins using the SSH. To start a remote login session, a user of client K first sends a login request with his user ID and a list of public key IDs. The list of public key IDs may include the identifiers for one or more of an SSH-1 key, an SSH-2 RSA key, an SSH-2-DSA key, and any other public keys compliant with the SSH protocol. Client N, which serves as an SSH server, checks the user's authorized key file for a public key that matches one of the key IDs in the request. If there is no match, client N sends back a request for a password to client K. If client N locates a public key that matches one of the key IDs in the request, client N uses the matching public key to construct a challenge. If there are multiple public keys matching the key IDs in the request, client N may pick any of the matching public keys (typically, the first matching key in the key ID list) to construct a challenge and sends the challenge to client K. In response to the challenge, client K constructs a response with the user's private key that matches the public key in the challenge, and sends the response back to client N. Client N then checks the response to determine whether it matches the expected response. If there is a match, client N logs-in the user.

In some scenarios, the SSH also allows the SSH server to request a password in addition to performing the above public key-private key challenge-response. If a password is requested in addition to the public key-private key challenge-response, the user may be prompted to supply a password after the response is sent to the client N.

The security of the password-less remote logins relies on the integrity of the authorized key files. If a user's authorized key file has been compromised, an intruder may be able to remotely log onto a system as the user. As mentioned above, systems that use NFS-mounted directories generally have a security loophole that allows an intruder to impersonate a legitimate user to create or modify the contents of the user's authorized key file from a system local to the intruder. Once the authorized key file is compromised, the intruder may remotely log onto any other system, as the user, that mounts home directories from the same NFS server as the intruder's local system. The technique that closes this loophole will be described in detail in connection with FIGS. 2-4.

Figure 2:
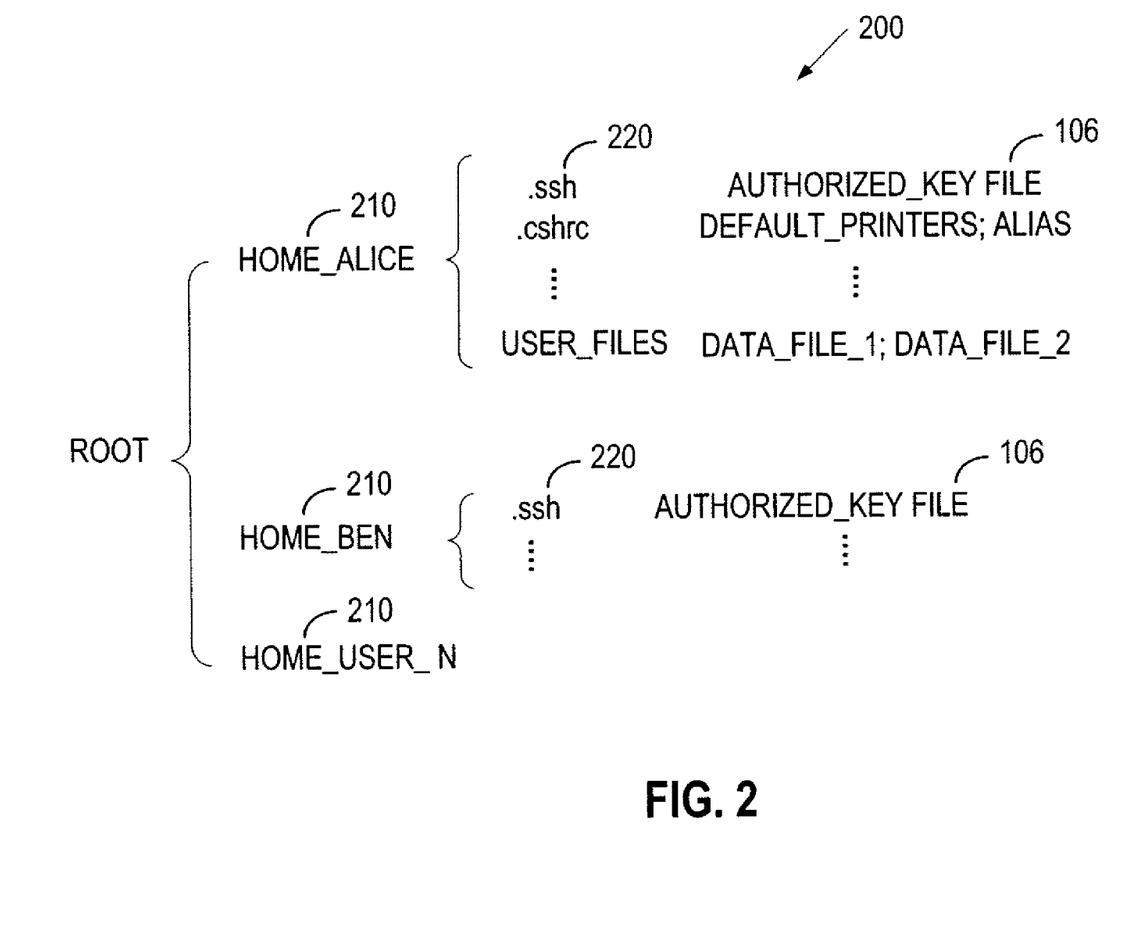
FIG. 2 illustrates an example of a file system structure in which authorized key files are stored.

FIG. 2 illustrates an example of a directory structure 200 stored in the data storage 105 and managed by the file server 108. The directory structure 200 includes a plurality of home directories 210, each associated with a user. Each home directory 210 contains configuration settings, user files, and other user-related data. A file server that runs Unix® or Unix®-like operating systems (e.g., Linux) generally organizes the files under a home directory into a plurality of sub-directories, some of which having a "." prefix. The "." prefix generally indicates a sub-directory as containing system-related data, e.g., default printer information, aliases, etc. The sub-directories without the "." prefix generally contain system-related files, e.g., user files. Illustratively, the authorized key file 106 of a user is stored in an .ssh sub-directory 220 of the user's home directory. Each time the user submits a login request, the authorized key file 106 of that user is read to construct public key-private key challenge-response, as described above.

In an embodiment according to the present invention, the authorized key file 106 in each of the home directories 210 has zero length and is owned by the root user of the file server 108. The process of creating zero-length authorized key files 106 is described in detail in connection with FIGS. 3-5.

Figure 3:
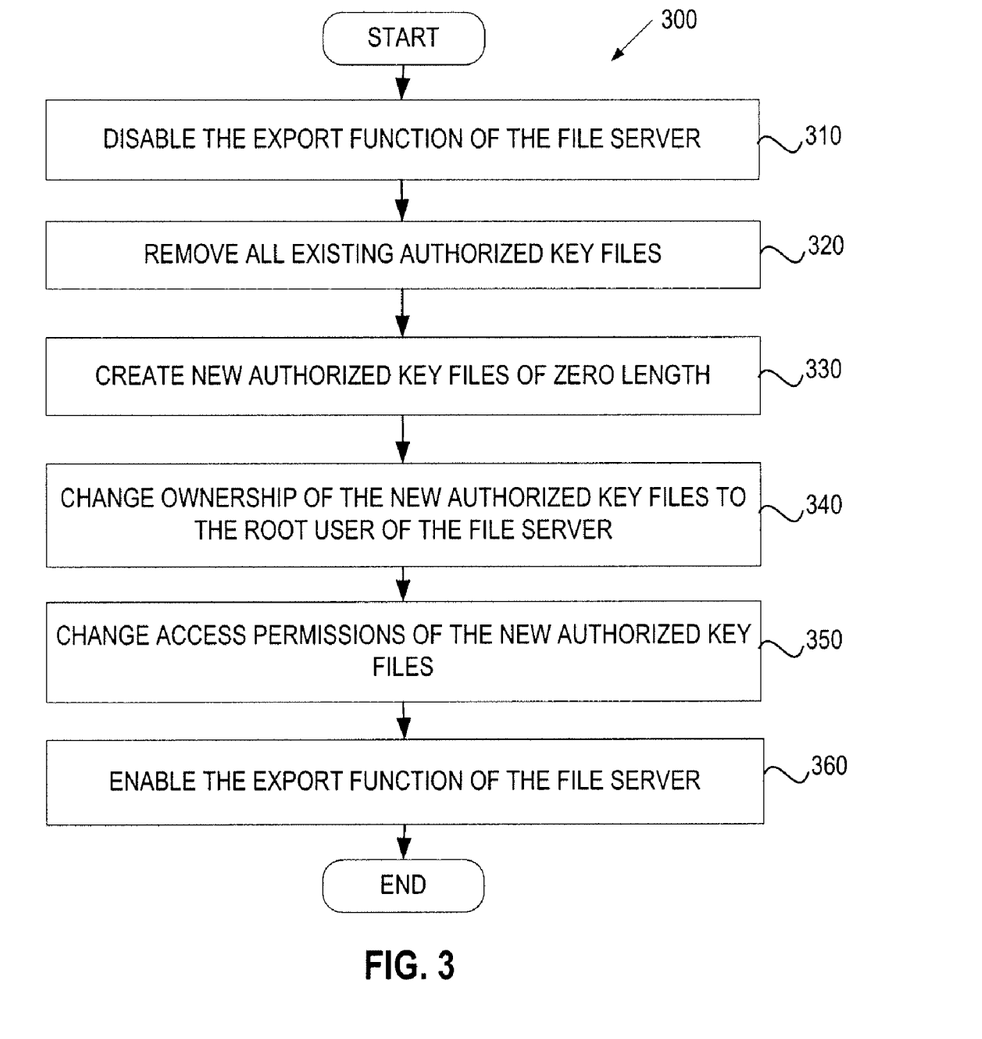
FIG. 3 is a flow diagram of one embodiment of a process for disabling password-less remote logins.
Figure 4A:
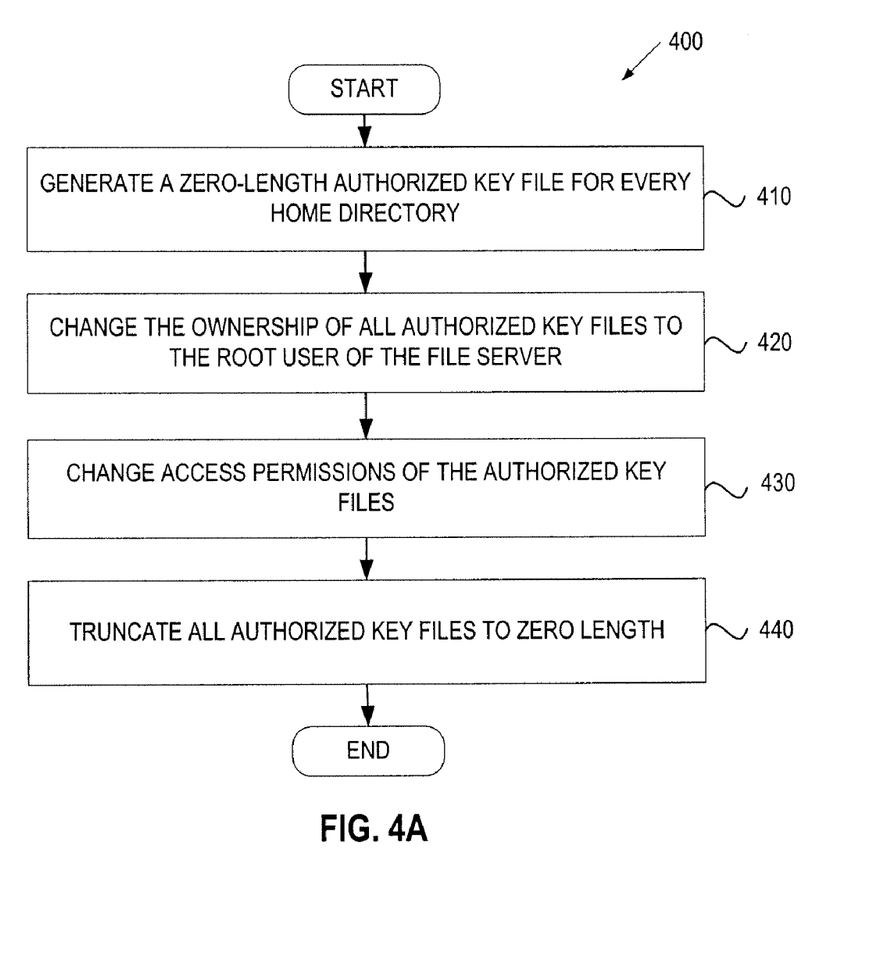
FIG. 4A is a flow diagram of an alternative embodiment of a process for disabling password-less remote logins.
Figure 4B:
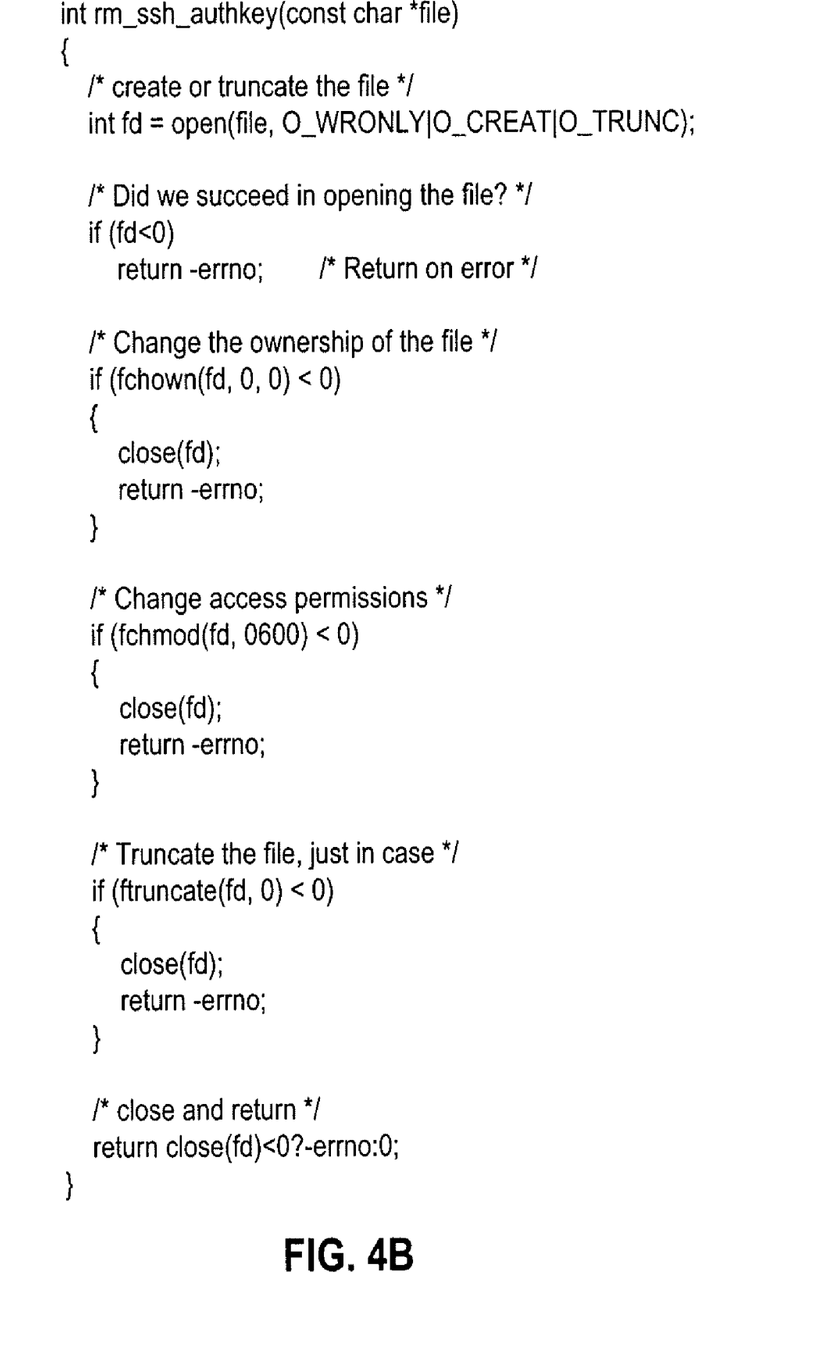
FIG. 4B is an example of a C program that implements the process of FIG. 4A.

FIG. 3 illustrates a flow diagram of one embodiment of a process 300 for disabling password-less remote logins. The process 300 may be performed by processing logic 626 of FIG. 6 that may comprise hardware (e.g., circuitry, dedicated logic, programmable logic, microcode, etc.), software (such as instructions run on a processing device), or a combination thereof. In one embodiment, the process 300 is performed by the file server 108 of FIG. 1.

Referring to FIG. 3, at block 310, the processing logic 626 begins with disabling an export function of the file server 108. The export function makes those files managed by the file server 108 available to the clients 102. After the export function is disabled, the home directories provided by the file server 108 become unavailable to all of the clients 102. The disablement effectively "locks" the files on the file server 108 to ensure that contents of the authorized key files will not be modified by any client 102 during the generation of new authorized key files. The export function may be disabled with a command issued by an administrator of the file server 108 or by other secure means. At block 320, all existing authorized key files are removed from the home directories. The removal of all existing authorized key files ensures that all illegitimate keys, if any, be deleted from the system to allow the system to start from a clean slate. At block 330, a new authorized key file of zero length is created for each home directory. The ownership and the access permissions of the new authorized key files are changed, at blocks 340 and 350, respectively, such that the authorized key files are owned by the root user of the file server 108, readable and writable only by the root user.

A root user is a person with the root access privilege. Illustratively, the person with the root access privilege is the system administrator of the file server 108. At block 360, the export function is enabled, making the home directories available to the clients 102. At this point, the user's public key information no longer exists. Thus, if a user wishes to log onto a remote client 102 that mounts home directories from the file server 108, the user will be prompted for a password. If the user wishes to use public key authentication to log onto the remote client 102, the user will need to submit his public keys to the system administrator of the file server 108 for inclusion into his authorized key file.

FIG. 4A illustrates a flow diagram of an alternative embodiment of a process 400 for disabling password-less remote logins. The process 400 may be performed by processing logic 626 of FIG. 6 that may comprise hardware (e.g., circuitry, dedicated logic, programmable logic, microcode, etc.), software (such as instructions run on a processing device), or a combination thereof. In one embodiment, the process 400 is performed by the file server 108 of FIG. 1.

Referring to FIG. 4A, at block 410, the process 400 begins with the processing logic 626 generating an authorized key file of zero length in every home directory. Such authorized key file may be generated by overwriting an existing authorized file with a file of zero length. Alternatively, an existing authorized file may be truncated to zero length to generate a zero-length file. For those home directories that do not have existing authorizing key files, authorized key files of zero length are created in those home directories. At block 420, the ownership of all of the new authorized key files is changed to the root user of the file server 108. At block 430, the access permissions of the authorized key files are changed such that these files are readable and writable only by the root user. At block 440, the operation performed at block 410 is repeated to prevent any key from being added to an authorized key file immediately before the change of ownership. As the overwriting (or truncating) operation (block 410) and the change of ownership/access permissions (blocks 420 and 430) cannot be performed in one atomic step, a person may be able to add a key to an authorized key file after the operation of block 410 but before the change of ownership at block 420. As a result, this authorized key file would have non-zero length and be owned by the root user. Thus, the operation of block 430 is performed to ensure that all of the authorized key files are reduced to zero length.

In a Unix® or Unix®-like system, a file truncating operation creates a file of zero length if the file does not already exist. For example, some systems provide a system call "open," which, when passing a correct set of parameters, opens a file and truncate it to zero length if the file already exists, or creates a file if the file does not exist. An example of a C program that implements the process 400 is provided in FIG. 4B.

It should be noted that while using process 400, it is possible for another process that has obtained an open file handle referencing the file being modified by process 400, before process 400 has commenced, to write data to the file after process 400 has finished. Since process 400 has changed the ownership and permissions of the file, any changes made by the other process would not affect the ultimate result of disabling SSH logins without passwords. As an alternative approach, another process that does not have the above-mentioned problem is described in FIG. 5A.

Figure 5A:
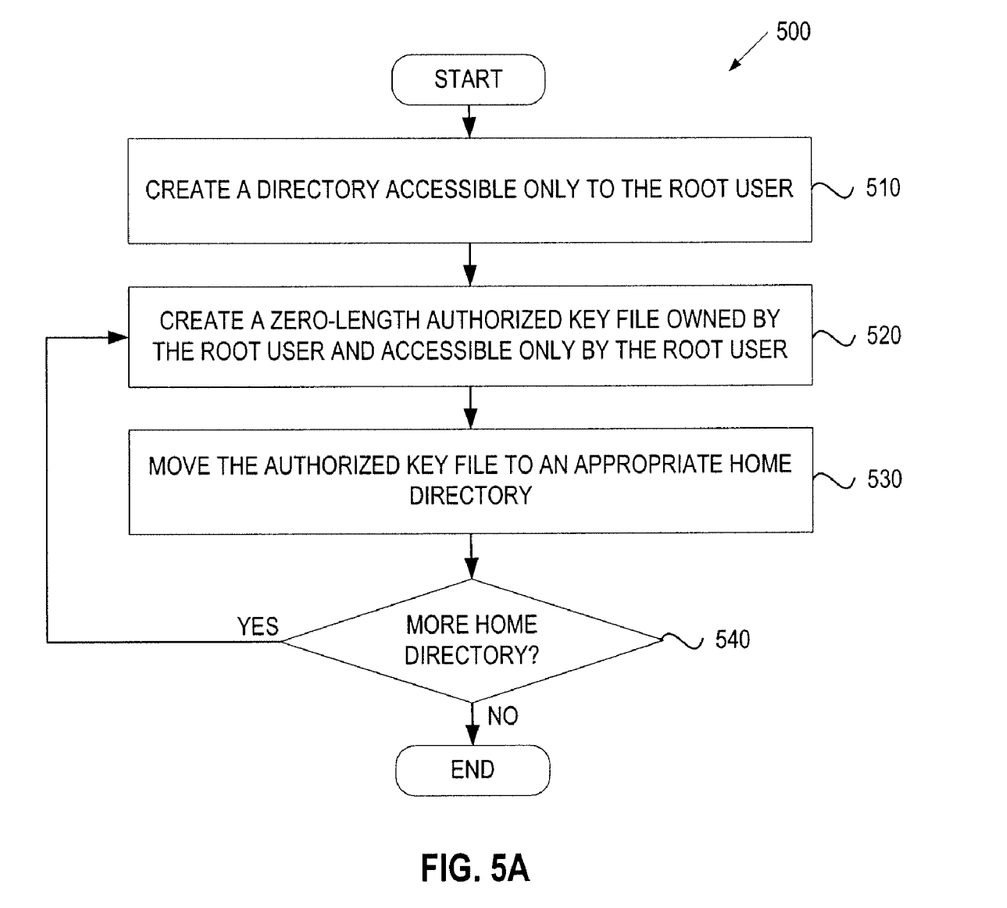
FIG. 5A is a flow diagram of yet another alternative embodiment of a process for disabling password-less remote logins.
Figure 5B:
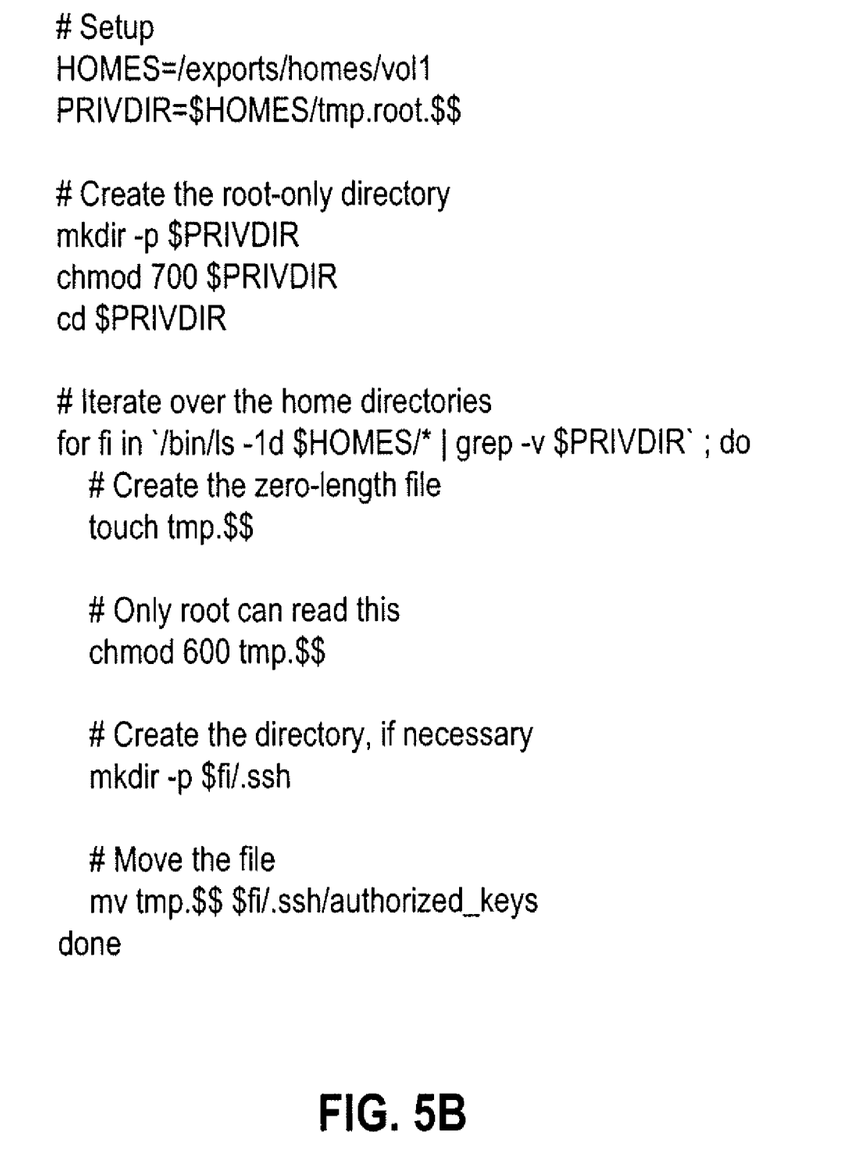
FIG. 5B is an example of a shell script that implements the process of FIG. 5A.
Figure 5C:
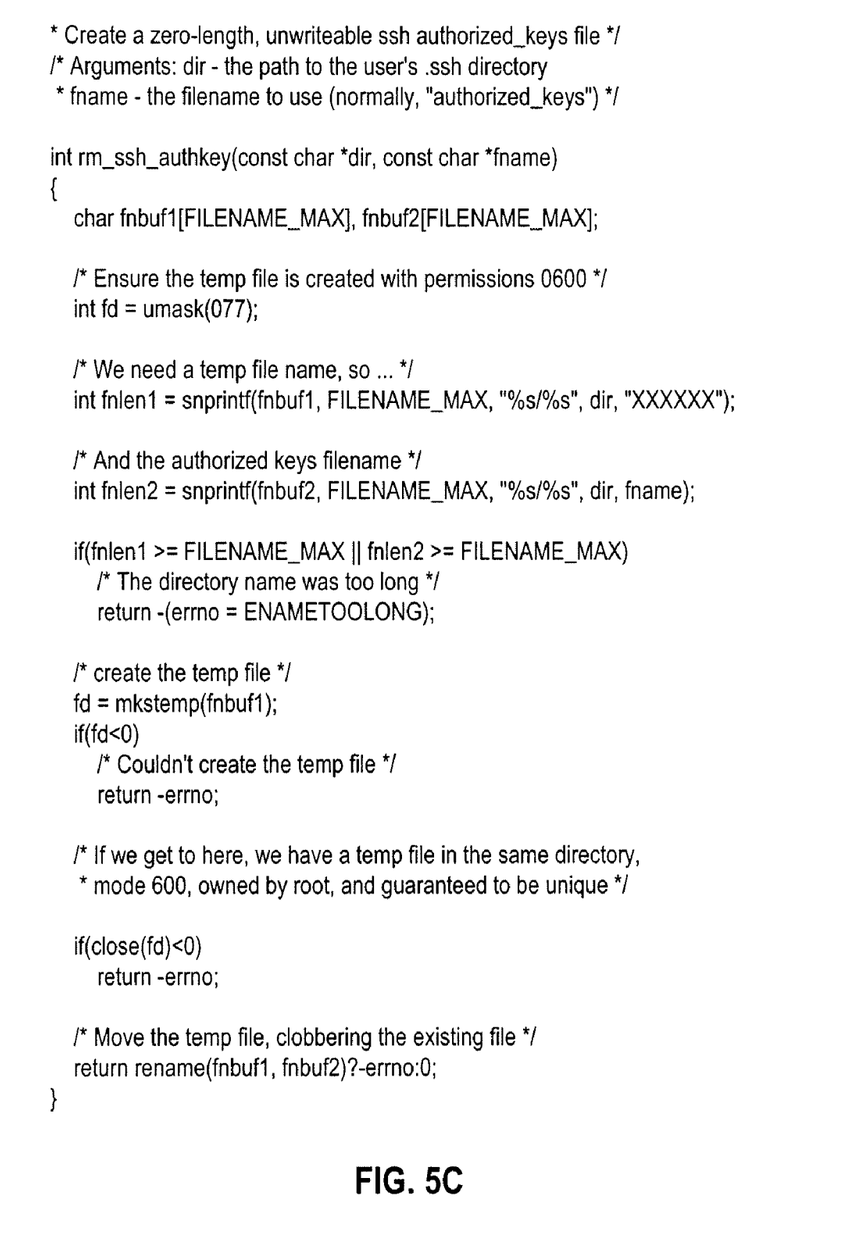
FIG. 5C is an example of a C program that implements the process of FIG. 5A.

FIG. 5A illustrates a flow diagram of an alternative embodiment of a process 500 for disabling password-less remote logins. The process 500 may be performed by processing logic 626 of FIG. 6 that may comprise hardware (e.g., circuitry, dedicated logic, programmable logic, microcode, etc.), software (such as instructions run on a processing device), or a combination thereof. In one embodiment, the process 500 is performed by the file server 108 of FIG. 1.

Referring to FIG. 5A, at block 510, the process 500 begins with the processing logic 626 creating a directory accessible only to the root user and on the same file system served by the file server as the exported home directories. At block 520, for each home directory, the root user on the file system creates a zero-length temporary file in the directory, owned by the root user and accessible only by the root user. At block 530, the root user moves the temporary file to an appropriate home directory in the file system as the authorized key file for that home directory. If there are more directories in the file system (block 540), the process 500 repeats the operations of blocks 520-530. Otherwise, the process 500 completes.

For example, an NFS server may have a volume of home directories that it exports as /exports/homes/vol1, where the home directories of all users are directly under the export (that is, user1 would have a home directory of /exports/homes/vol1/user1). In this example, the operation that implements the process 500 may proceed, illustratively, as shown in the shell script of FIG. 5B or the C program of FIG. 5C. While it is necessary for the shell script version of FIG. 5B to implement a root-only directory (block 510), the C program version of FIG. 5C does not need such a directory. This is because there is no guarantee that the file referred to as "tmp.$$" is actually created by the shell script. If the file already exists, the same race condition for process 400 as mentioned above may occur. By contrast, in the C program of FIG. 5C, the use of mkstemp guarantees that a new file owned by the root with the appropriate permissions is created. Since the file created by mkstemp will have exactly the contents and permissions as specified in the code, it is unnecessary to create a root-only directory in the C program of FIG. 5C.

Figure 6:
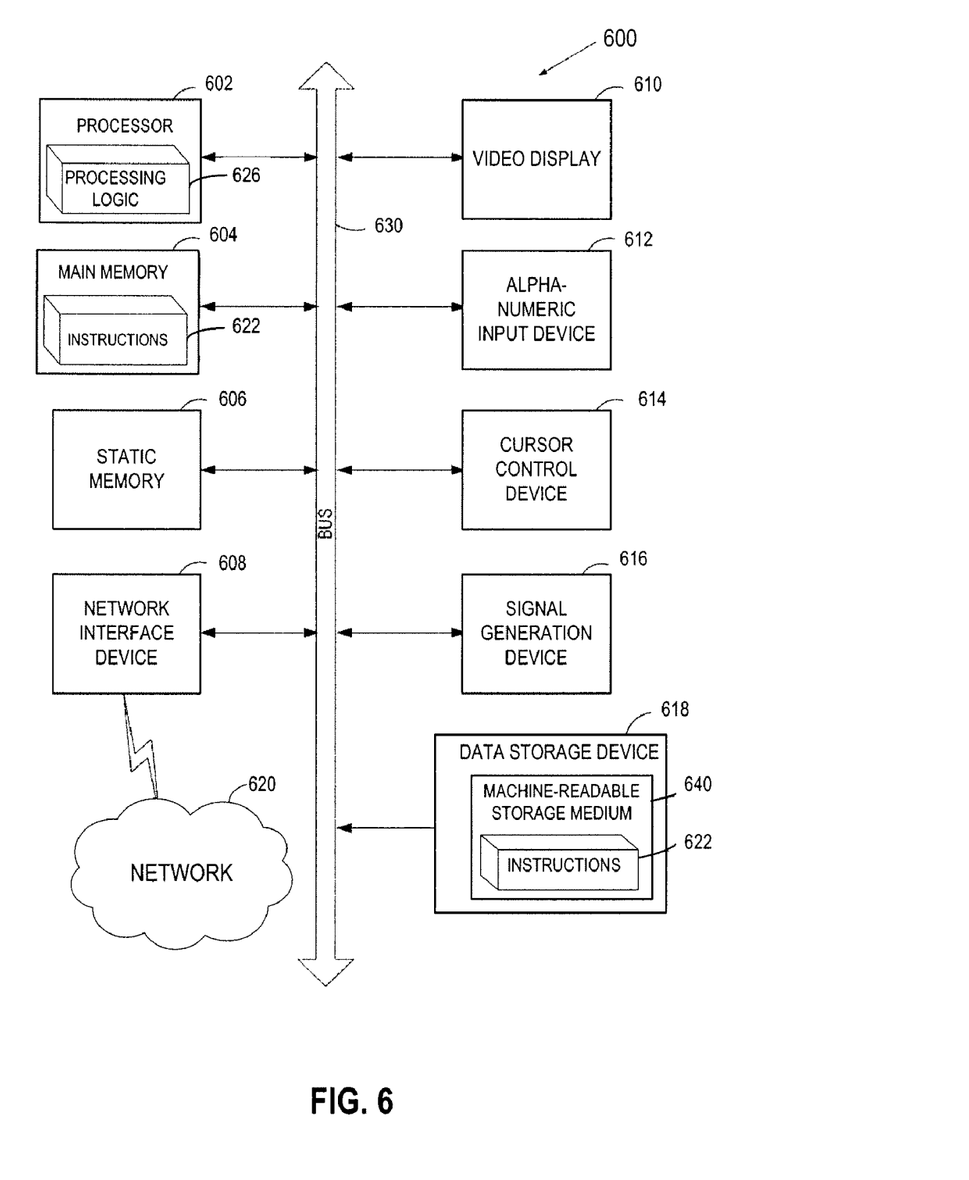
FIG. 6 illustrates a block diagram of an exemplary computer system implementing some embodiments of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium (or more specifically, computer-readable storage medium) 640 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

The machine-readable storage medium 640 may also be used to store the authorized key files 106 of FIG. 1. While the machine-readable storage medium 640 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and system for disabling password-less remote logins have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
receiving a remote login request at a first computing system from a user of a second computing system, both the first computing system and the second computing system mounting home directories from a file server, the request including a public key associated with the user;
locating in the home directories an authorized key file associated with the user, the authorized key file having zero length and owned by a root user of the file server; and
prompting the user of the second computing system for a password in response to the request.

2. The method of claim 1, wherein each of the home directories contains a same zero-length authorized key file owned by the root user.

3. The method of claim 1, further comprising:
creating the authorized key file on the file server for authorizing remote logins; and
denying access to the authorized key file by anyone other than the root user of the file server.

4. The method of claim 1, further comprising:
creating a temporary file with zero length and owned by the root user; and
moving the temporary file to each of the home directories as the authorized key file for the home directory.

5. The method of claim 1, wherein the file server is a network file system (NFS) server.

6. The method of claim 1, further comprising:
disabling an exporting function of the file server;
truncating all existing authorized key files to zero length;
changing an ownership and access permissions of all of the existing authorized key files to allow access only by the root user before restoring the exporting function of the file server.

7. The method of claim 1, further comprising:
generating the authorized key file for each of the home directories;
changing an ownership and access permissions of the authorized key file to allow access only by the root user; and
truncating the authorized key file to zero length.

8. The method of claim 1, wherein the computing system runs a process in accordance with the Secure Shell (SSH) protocol to process the remote login request.

9. A system comprising:
data storage to store a plurality of authorized key files under a plurality of home directories, each of the authorized key files having zero length and is used to authenticate a user associated with one of the home directories using public key cryptography; and
a file server coupled to the data storage to export the home directories to clients and to deny access to the authorized key files by anyone other than a root user of the file server.

10. The system of claim 9, wherein the file server is a network file system (NFS) server.

11. The system of claim 9, further comprising:
a first client to send a remote login request, the request including a public key associated with a user of the first client; and
a second client to receive the remote login request from the first client, the second client to locate an authorized key file associated with the user from the plurality of authorized key files, the second client to prompt the first client for a password in response to the request,
wherein both the first client and the second client mount home directories from the file server.

12. The system of claim 11, wherein each of the first client and the second client runs a process in accordance with the Secure Shell (SSH) protocol.

13. A non-transitory computer-readable storage medium including data that, when accessed by a computer system, cause the computer system to perform a method comprising:
receiving a remote login request at a first computing system from a user of a second computing system, both the first computing system and the second computing system mounting home directories from a file server, the request including a public key associated with the user;
locating in the home directories an authorized key file associated with the user, the authorized key file having zero length and owned by a root user of the file server; and
prompting the user of the second computing system for a password in response to the request.

14. The non-transitory computer-readable storage medium of claim 13, wherein the file server is a network file system (NFS) server.

15. The non-transitory computer-readable storage medium of claim 13, wherein the method further comprises:
disabling an exporting function of the file server;
truncating all existing authorized key files to zero length; and
changing an ownership and access permissions of all of the existing authorized key files to allow access only by the root user before restoring the exporting function of the file server.

16. The non-transitory computer-readable storage medium of claim 13, wherein the method further comprises:
generating the authorized key file for each of the home directories;
changing an ownership and access permissions of the authorized key file to allow access only by the root user; and
truncating the authorized key file to zero length.

17. The non-transitory computer-readable storage medium of claim 13, wherein receiving a remote login request further comprises:
processing the remote login request in accordance with the Secure Shell (SSH) protocol.

18. The non-transitory computer-readable storage medium of claim 13, wherein the method further comprises:
creating a temporary file of zero length owned by the root user; and
moving the temporary file to each of the home directories as the authorized key file for the home directory.

19. The non-transitory computer-readable storage medium of claim 13, wherein the method further comprises:
creating the authorized key file by overwriting an existing authorized key file with a zero-length file.

20. The non-transitory computer-readable storage medium of claim 13, wherein the method further comprises:
creating the authorized key file in response to a determination that the authorized key file associated with the user does not exist.

* * * * *